United States Patent Office 2,849,506
Patented Aug. 26, 1958

2,849,506

PREPARATION OF 15,15'-CIS-β-CAROTENE

Otto Isler, Basel, Herbert Lindlar, Reinach, Basel, and Rudolf Rüegg, Basel, Switzerland, assignors to Hoffmann-La Roche Inc., Nutley, N. J., a corporation of New Jersey No Drawing. Application December 13, 1955
Serial No. 552,722

Claims priority, application Switzerland
December 24, 1954

3 Claims. (Cl. 260—666)

This invention relates to an improved process for the preparation of 15,15'-cis-β-carotene, an important intermediate in the total synthesis of β-carotene. More particularly, the invention relates to such a process which is technically attractive for use in the commercial manufacture of β-carotene, and which results in a greater yield of 15,15'-cis-β-carotene than hitherto attainable. (In the nomenclatures herein employed, the numbers refer to the numbering of the carotene carbon skeleton shown in Liebigs Annalen der Chemie, volume 573, page 3 [1951].)

Briefly described, the invention relates to a process for the preparation of 15,15'-cis-β-carotene which comprises reacting 15,15'-dehydro-β-carotene, suspended in an inert organic liquid, with approximately one molar proportion of elemental hydrogen in the presence of a hydrogenation catalyst selective to catalyze the hydrogenation of an acetylenic linkage preferentially to an olefinic linkage. Selective hydrogenation catalysts of this type are well known to those skilled in the art; suitable catalysts being disclosed, for example, in a publication by Lindlar, Helvetica Chimica Acta 35, 446 (1952).

Suitable inert organic liquids are those which do not react with the dehydro-carotene starting material nor with the catalyst, under the conditions of the reaction. Saturated or unsaturated hydrocarbons or mixtures of the same can be employed. Saturated hydrocarbons such as pentanes, hexanes, cyclohexane and the like are well suited for use in the process of the invention. Inasmuch as the inert organic liquid medium in general possesses some solvent action on 15,15'-dehydro-β-carotene, it should be understood that the inert organic liquid is to be used in such proportion, relative to the 15,15'-dehydro-β-carotene subjected to hydrogenation, that the 15,15'-dehydro-β-carotene is not entirely dissolved but that at least a major proportion thereof remains in suspension.

Especially advantageous are petroleum ethers having a boiling range between about 80° C. and about 120° C. It is recommended to use from about 10 to about 20 parts by weight of such petroleum ethers for each part by weight of 15,15'-dehydro-β-carotene. In such case, as hydrogenation progresses, the 15,15'-dehydro-β-carotene gradually goes into solution, and the hydrogenation product, which is very difficultly soluble, is simultaneously precipitated. The 15,15'-cis-β-carotene formed as hydrogenation product is thereby protected from further hydrogenation, thus favoring increased yields. The uptake of hydrogen ceases spontaneously as soon as a slight excess over the theoretical amount has been absorbed.

If it should be desired to isolate the hydrogenation product, the hydrogenation mixture is filtered, and 15,15'-cis-β-carotene is separated from the catalyst by dissolving the former in an inert solvent such as methylene chloride, carbon disulfide and the like; the solvent is then removed at low temperatures. Inasmuch as the hydrogenation product is very easily isomerized, it will often be advantageous to convert the 15,15'-cis-β-carotene, without isolation thereof, to all-trans-β-carotene, either before or after separation of the catalyst.

The invention is further described in the following example which is illustrative but not limitative thereof.

Example 100 g. of 15,15'-dehydro-β-carotene was suspended in 1000 ml. of petroleum ether (boiling range 80°–100° C.). 12 g. of a palladium-on-calcium carbonate catalyst partially inactivated with lead (specifically described at page 450 of the Helvetica Chimica Acta publication identified above) and 6 ml. of quinoline were added. The reaction mixture was shaken in a hydrogen atmosphere (slight superatmospheric gauge hydrogen pressure) at room temperature. The hydrogenation came to a stop when a little more than one molar proportion of hydrogen had been taken up. The mixture was filtered, the solid residue was shaken well with 3600 ml. of methylene chloride, and the resulting suspension was filtered. The methylene chloride solution obtained as filtrate was concentrated at 20° C. in a water pump vacuum, and the residue was shaken for 30 minutes in a carbon dioxide atmosphere with 1000 ml. of petroleum ether (boiling range 30°–70° C.). The petroleum ether extract was filtered and the filtrate was taken to dryness in vacuo. There were thus obtained 95 g. of 15,15'-cis-β-carotene of M. P. 150°–151° C.; absorption maxima in the ultraviolet spectrum at 338 m$\mu$ (E$_1^1$ 1040), 450 m$\mu$ (E$_1^1$ 1765), 477 m$\mu$ (E$_1^1$ 1430)

in petroleum ether.

We claim:

1. A process for the preparation of 15,15'-cis-β-carotene which comprises catalytically hydrogenating a mixture of 15,15'-dehydro-β-carotene and an inert hydrocarbon liquid, wherein initially at least a major proportion of the said dehydrocarotene is in suspension in said hydrocarbon liquid.

2. A process for the preparation of 15,15'-cis-β-carotene which comprises reacting a mixture of 15,15'-dehydro-β-carotene and an inert hydrocarbon liquid, wherein initially at least a major proportion of the said dehydrocarotene is in suspension in said hydrocarbon liquid, with elemental hydrogen in the proportion of approximately one mol of hydrogen for each mol of the said dehydro-β-carotene, in the presence of a hydrogenation catalyst selective to catalyze the hydrogenation of an acetylenic linkage preferentially to an olefinic linkage.

3. A process for the preparation of 15,15'-cis-β-carotene which comprises reacting a mixture of 15,15'-dehydro-β-carotene and a petroleum ether boiling in a range between about 80° C. and about 120° C., wherein from about 10 to about 20 parts by weight of said petroleum ether are employed for each part by weight of the said dehydro-β-carotene, with elemental hydrogen in the proportion of approximately 1 mol of hydrogen for each mol of the said dehydro-β-carotene, in the presence of a palladium-lead hydrogenation catalyst selective to catalyze the hydrogenation of an acetylenic linkage preferentially to an olefinic linkage.

References Cited in the file of this patent

UNITED STATES PATENTS 2,671,112    Inhoffen et al. _____ Mar. 2, 1954